US008970703B1

(12) United States Patent
Thomas, II et al.

(10) Patent No.: US 8,970,703 B1
(45) Date of Patent: Mar. 3, 2015

(54) AUTOMATICALLY TRIGGERED VIDEO SURVEILLANCE SYSTEM

(75) Inventors: William Howard Thomas, II, King George, VA (US); Vincent J. Vendetti, King George, VA (US); Robert L. Schroeder, Jr., Dahlgren, VA (US); Matthew A. Treier, King George, VA (US); Josef A. Koza, Spotsylvania, VA (US); Mark DiGiovanni, New Kent, VA (US); Michael J. Lavery, Fredricksburg, VA (US); Patrick A. Dezeeuw, Fredricksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1923 days.

(21) Appl. No.: 12/148,073

(22) Filed: Apr. 15, 2008

Related U.S. Application Data

(60) Provisional application No. 60/925,905, filed on Apr. 16, 2007.

(51) Int. Cl.
*H04N 7/18* (2006.01)
(52) U.S. Cl.
CPC ................................ *H04N 7/181* (2013.01)
USPC .......................................................... 348/159
(58) Field of Classification Search
CPC ..................................................... H04N 7/181
USPC .......................................................... 348/159
See application file for complete search history.

(56) References Cited

U.S. PATENT DOCUMENTS

| 5,762,552 | A | 6/1998 | Vuong et al. ..................... 463/25 |
| 6,195,680 | B1 | 2/2001 | Goldszmidt et al. .......... 709/203 |
| 6,272,529 | B1 | 8/2001 | Lum ............................. 709/203 |
| 6,493,377 | B2 | 12/2002 | Schilling et al. .............. 374/130 |
| 7,224,260 | B1 | 5/2007 | Nowak ..................... 340/286.02 |
| 7,250,853 | B2 * | 7/2007 | Flynn ........................... 340/506 |
| 2004/0158869 | A1 | 8/2004 | Safran et al. .................. 725/105 |
| 2005/0162268 | A1 | 7/2005 | Grindstaff et al. ............ 340/531 |
| 2007/0056002 | A1 | 3/2007 | Ganesan et al. ................ 725/95 |
| 2007/0143804 | A1 | 6/2007 | Wang ............................ 725/95 |
| 2007/0152852 | A1 | 7/2007 | Suzuki et al. ................... 341/50 |
| 2007/0233698 | A1 * | 10/2007 | Sundar et al. .................. 707/10 |
| 2008/0084473 | A1 * | 4/2008 | Romanowich ................ 348/135 |

* cited by examiner

*Primary Examiner* — Bryan Lee
(74) *Attorney, Agent, or Firm* — Gerhard W. Thielman, Esq.

(57) ABSTRACT

A method is provided for supplying to an operator a video stream from at least one of a plurality of cameras that capture images. This includes connecting the cameras and a computer to a network and recording the images from each camera into a corresponding buffer accessible to the computer. Upon detecting a triggering event associated with an event-recording camera, further operations include responding to the triggering event by depositing the images from an event-recording buffer corresponding to said event-recording camera as the video stream into a reviewable memory, and retrieving the video stream from the reviewable memory for the operator. The operator is preferably one of a commander using a command workstation, a lethal response operator using a lethal workstation, and a non-lethal response operator using a non-lethal workstation. Also preferably, each workstation is assigned as one of a primary brain and failover brains. The primary brain functions to execute software and issue control signals, so that if the primary brain fails, one of the failover brains assumes the functions, that failover brain being selected in a sequential order.

14 Claims, 8 Drawing Sheets

AUTOMATICALLY TRIGGERED VIDEO SURVEILLANCE SYSTEM

CROSS REFERENCE TO RELATED APPLICATION

Pursuant to 35 U.S.C. §119, the benefit of priority from provisional application 60/925,905, with a filing date of Apr. 16, 2007, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor. This invention was created with federal government support under Contract No. N00178-05-F-1183 awarded to CapTech Ventures, Inc.

BACKGROUND

The invention relates generally to a method for automatically recording and replaying video surveillance imagery from multiple cameras. In particular, this invention relates to continuous buffered recording of multiple video streams to capture pre- and post-trigger imagery associated with multiple triggering events, especially for use in a road-mobile vehicle.

Video surveillance to provide situational awareness in combat vehicles demands efficient use of limited computing and networking resources. Triggering events are typically isolated and demand that the surveillance camera already be looking in the direction of the event. Even then, the triggering event causes the capture of images generated after the event, resulting in the loss of actual event data.

Many modern cameras address this problem by buffering the image stream in the camera memory. This limited buffer can then be delivered upon demand through the network. Challenges arise in obtaining video segments that exceed the capacity of the camera's built-in buffer. Additionally, this approach requires that commands be sent to the camera to initiate the downloading of the buffered data. In some camera models, new imagery cannot be buffered until the data transfer has been completed.

Cameras mounted on pan-tilt platforms require response time for the platform to correctly position the camera for aiming at the region of interest and thereby miss the triggering event unless the platform serendipitously points in that direction beforehand.

SUMMARY

Situational awareness in combat entails continuous spatial and temporal coverage, including timeliness of imagery before, during and after the triggering event, efficient storage of data with rapid retrieval, while maintaining the ability to replay specific segments of surveillance records.

Situational awareness is particularly beneficial for operators of vehicles with limited vision due to vehicle design and operational constraints. In many modern combat vehicles, efforts to provide protection from battlefield hazards sacrifices operational senses, such as sight and hearing. When operators lack confidence of adequate sensory input, they may expose themselves to hostile fire in an effort to augment the available information, thereby dramatically increasing their exposure to risk.

Conventional surveillance systems yield disadvantages addressed by various exemplary embodiments of the present invention. In particular, embodiments provide continuously recording input from multiple cameras to expand buffering for capturing imagery over extended time, temporally overlapping the triggering event. Other various embodiments alternatively or additionally provide for buffering recorded images, archiving the buffered imagery in response to an external triggering signal, replaying a video stream on demand, including intervals before, during and after the trigger event.

Additional exemplary embodiments provide for recording still images from multiple camera to enable context interpretation of the recorded video segments, and to reduce network traffic to the camera, enabling less capable camera models to be used that are limited to producing the stream of images.

Various exemplary embodiments provide a method for supplying to an operator a video stream from at least one of a plurality of cameras that capture images. This includes connecting the cameras and a computer to a network and recording the images from each camera into a corresponding buffer accessible to the computer. Upon detecting a triggering event associated with an event-recording camera, further operations include responding to the triggering event by depositing the images from an event-recording buffer corresponding to the event-recording camera as the video stream into a reviewable memory, and retrieving the video stream from the reviewable memory for the operator.

In various exemplary embodiments, the operator can be one of a commander using a command workstation, a lethal response operator using a lethal workstation, and a non-lethal response operator using a non-lethal workstation. Preferably, each workstation is assigned as one of a primary brain and failover brains. The primary brain functions to execute software and issue control signals, so that if the primary brain fails, one of the failover brains assumes these functions, with the designated workstation being selected in a sequential order.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Installing a video surveillance system in a vehicle provides extensive visual input to operators with an otherwise limited view. Camera views for full 360° planar horizon coverage can be accomplished with a limited number of fixed cameras depending on required resolution and field of view. Fixed cameras are necessary in order to capture images that can be generated before a triggering event from an unknown direction and distance. In security surveillance scenarios, pre-positioned cameras can provide continuous video imagery before, during and after an event, such as opening a window or door equipped with a sensor.

Figure 1:
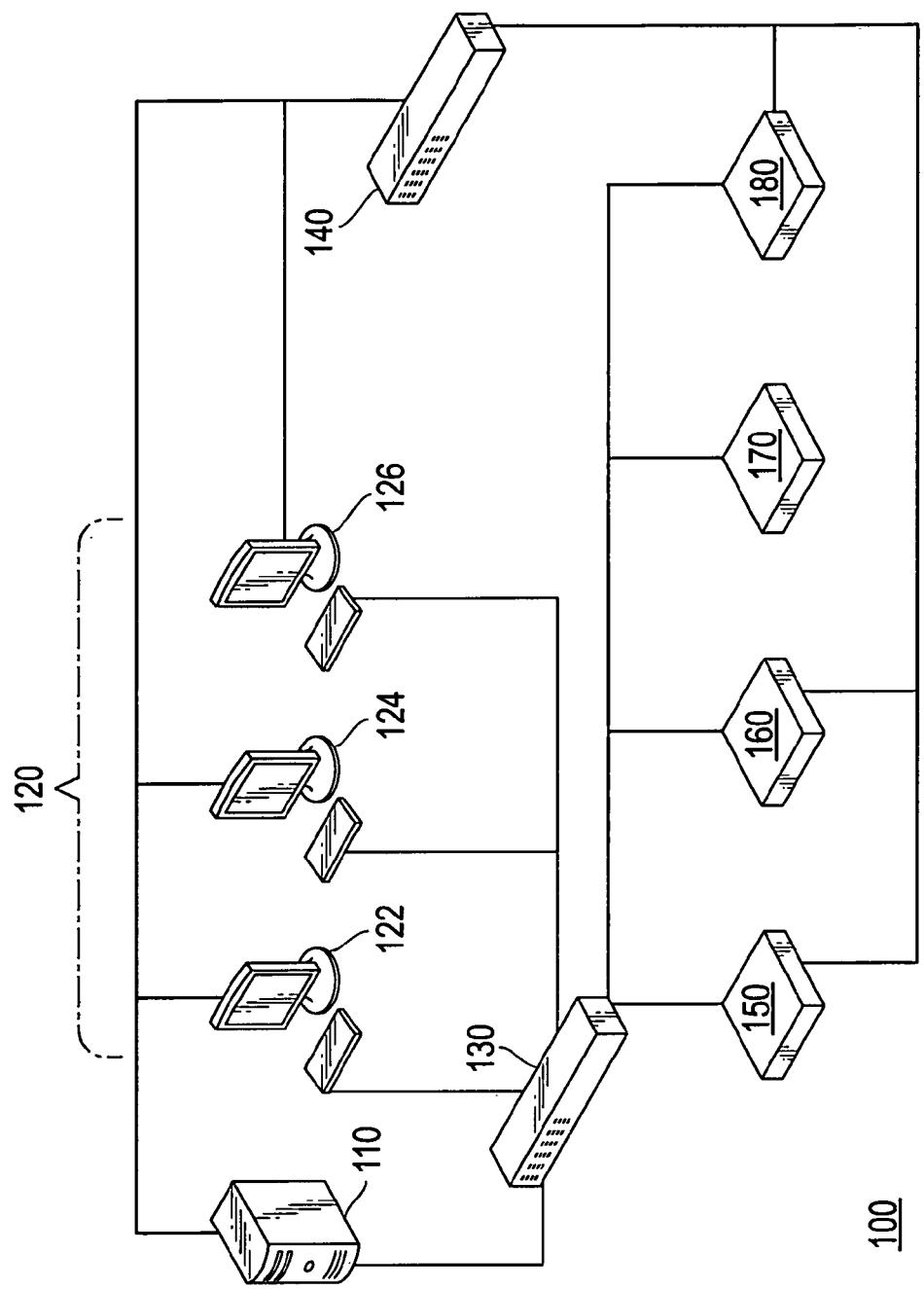
FIG. 1 is a hardware network diagram of a video surveillance system.

FIG. 1 shows a hardware network diagram 100 of the video surveillance system for a vehicle as described for various exemplary embodiments, such as installed in a road-mobile vehicle. A video server 110 provides network control and application software operation and connects to workstations 120 task-specific operators. The server 110 and workstations 120 can be state machines, such as computers. These workstations 120 include client interface terminals for a vehicle commander station 122, a lethal weapons operator 124, and a non-lethal instruments operator 126. The lethal operator 124 controls a large-caliber gun having an optical gunsight. The non-lethal operator 126 controls a variety of devices, such as a loudspeaker bullhorn, laser dazzler, etc.

The server 110 and workstations 120 connect to a main communications bus 130 using transmission control protocol (TCP) communication for exchanging operational instructions and information, and a video bus switch 140 for providing user datagram protocol (UDP) video streams to the terminals. The communications bus 130 also connects to a gun-mount video (called remote weapons station or RWS) information 150, infrared shot detection devices (called "overwatch" or OW) 160, other non-video devices 170 and video devices 180.

Figure 2:
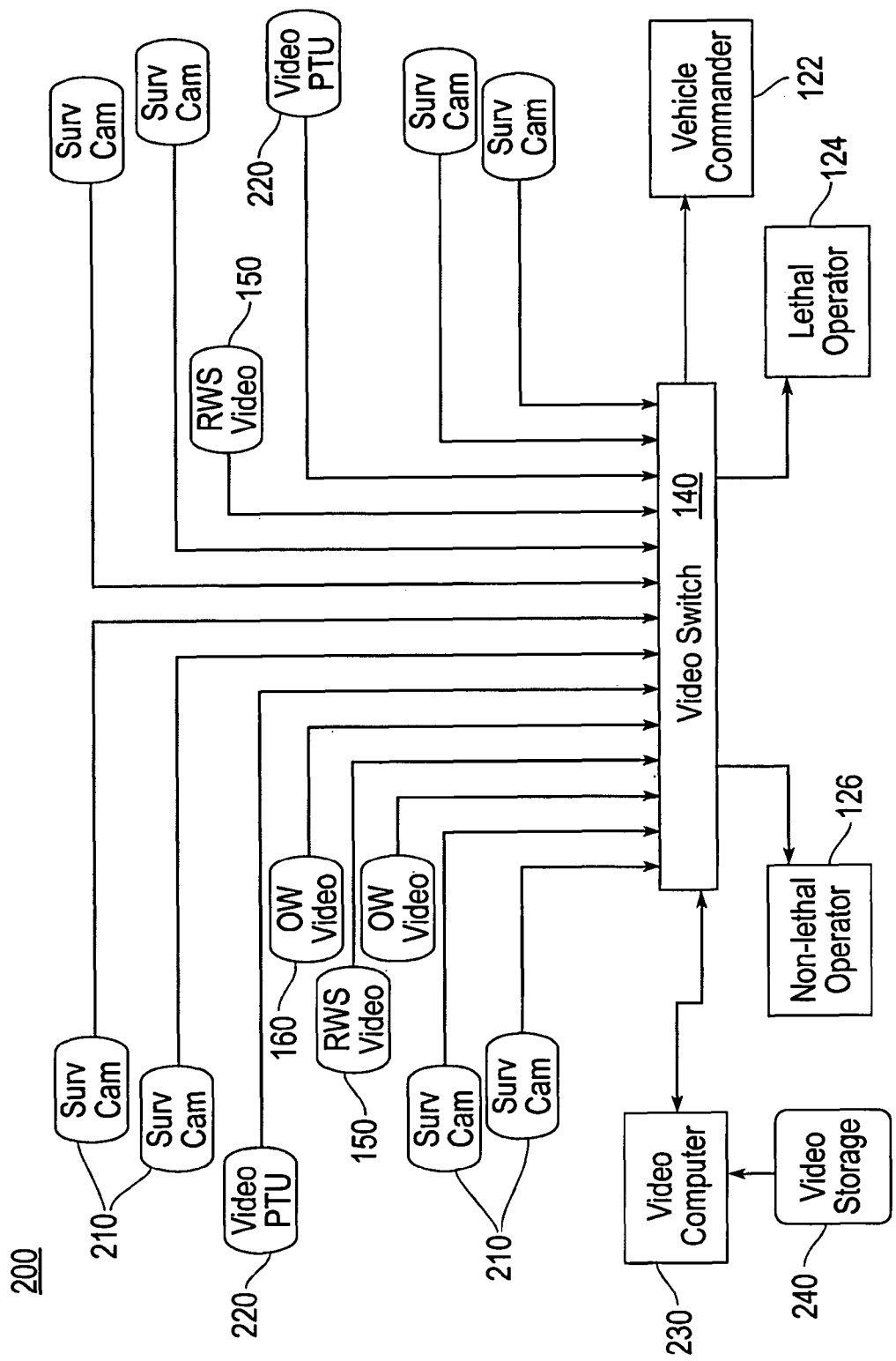
FIG. 2 is a data flow diagram for the video switch.

FIG. 2 shows a flow diagram 200 of information to and from the video switch 140, which receives information from surveillance cameras 210, video police tactical unit (PTU) 220, OW video 160 and RWS video 150. A video computer 230, whether integral to, in communication with, or isolated from the server 110, submits instructions to the video switch 140 and receives information, and provides for operator comparison information accessible from video storage 240 to provide to operator terminals for the commander 122, the lethal operator 124 and the non-lethal operator 126.

The visual information can be received by the computer 230 from the camera image providers 150, 160, 210, 220 for selected retrieval and review, such as after a triggering event. Video storage 240 can serve to separately buffer the input signals received from the cameras 210. Alternatively, each camera 210 may contain an individual buffer whose contents can be retrieved by the computer 230 via the video switch 140. The video storage 240 can also provide archival storage for previously buffered images to be retrieved for subsequent review of events captured by one or more specific cameras 210. Additional sensors can be employed to augment situational awareness, such as acoustic-sensitive instruments.

Figure 3:
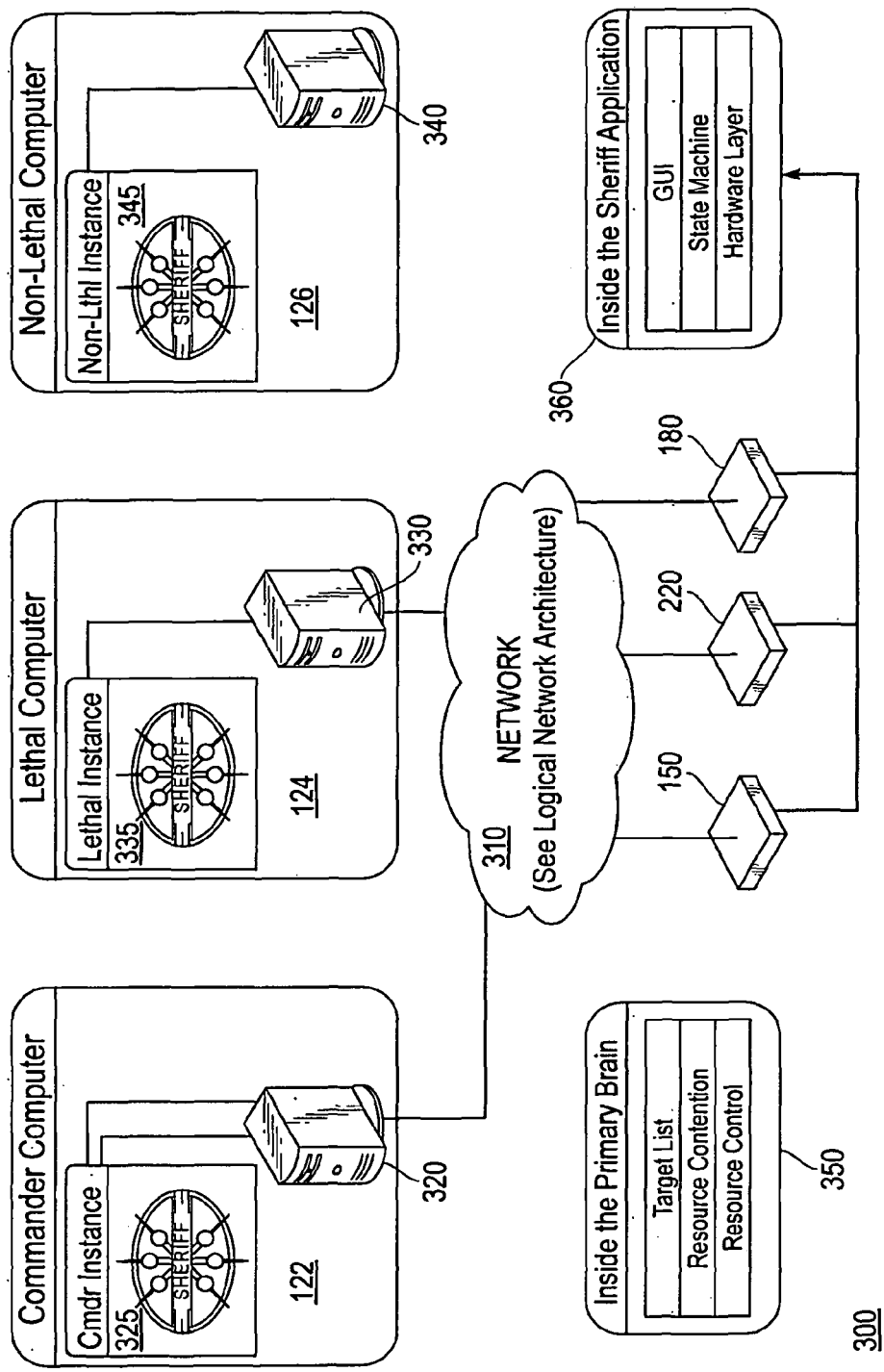
FIG. 3 is a software diagram of the video surveillance system.

FIG. 3 shows a software network diagram 300 for the workstations 120 connected to network architecture 310. The vehicle commander station 122 includes a primary brain (e.g., computer) 320 with software installed for commander instance 325 (i.e., for instantiation of the relevant software application). The lethal operator 124 includes a primary failover brain 330 having installed software for lethal instance 335. The non-lethal operator 126 includes a secondary failover brain 340 having installed software for non-lethal instance 345.

The commander instance 325 provides communication with the primary brain 320 running as a service on the same computer for operations such as target acquisition. Sheriff represents an example of such application software for use in such terminals 120. All communication for control of a resource passes through the primary brain 320 through the main communications bus 130 for passing signals through the network 310.

Primary and secondary brains 330, 340 are synchronized to the primary brain 320, so that in the event of primary brain disablement from the network 310, the sequentially subsequent processor, in this case the primary failover brain 330, becomes the primary. Upon returning online, the original primary is relegated to the last backup to become the new secondary failover brain. Similarly, in the event of primary failover disablement from the network 310, the secondary failover brain 340 becomes the primary.

The primary brain 320 includes items 350 such as a target list, resource contention prioritization, and resource control protocol. The Sheriff software 360 as code on the instances 325, 335, 345, includes a graphical user interface (GUI), state machine (for determining and operating on logic states) and a hardware layer for signal exchange.

Figure 4:
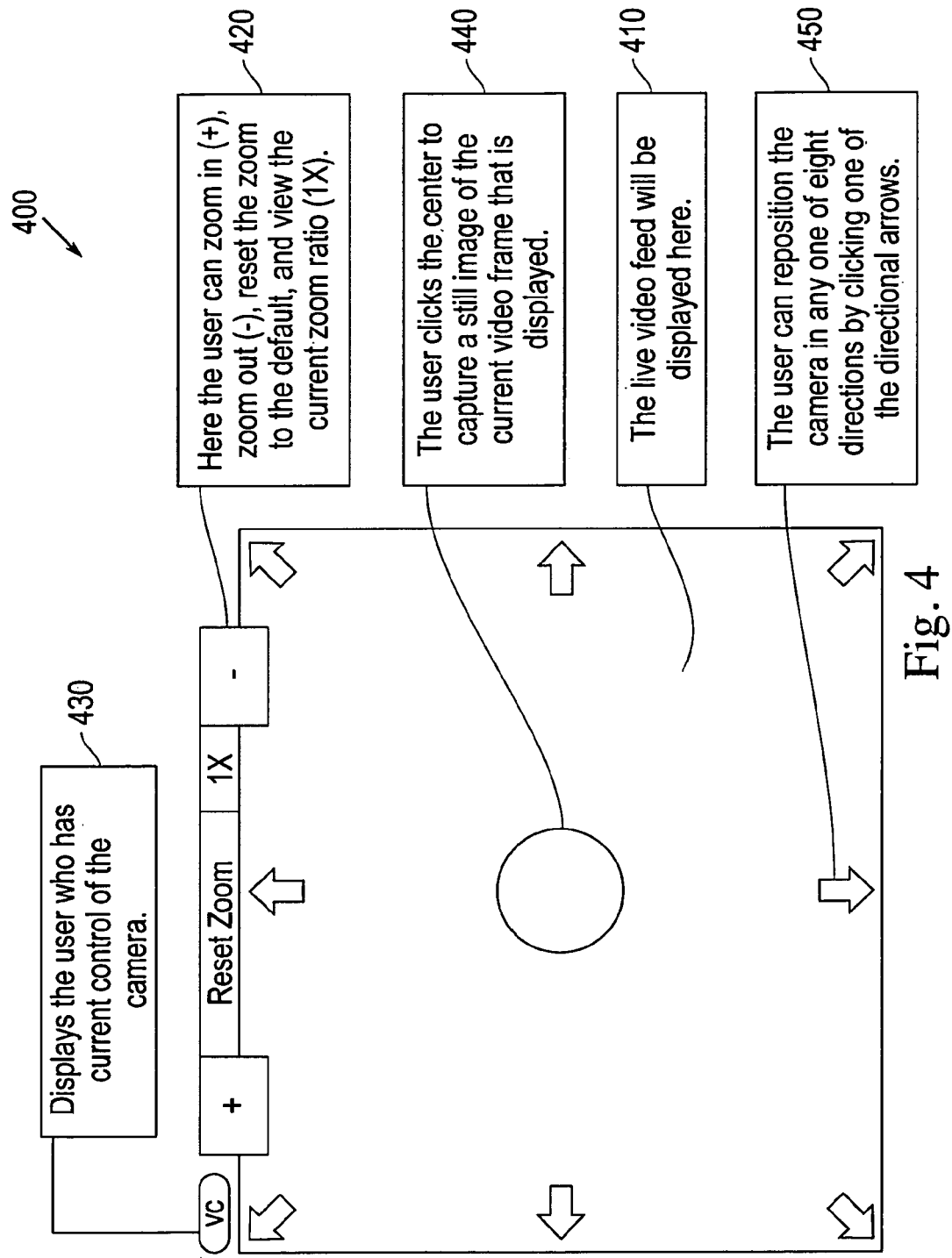
FIG. 4 is a graphical user interface for camera control.

FIG. 4 shows a GUI display 400 including a window 410 for camera control on a pan-tilt unit. The window 410 displays the live video feed from a selected camera. An upper menu 420 provides enlarge (+), reduce (−), reset zoom to default, and magnification ratio (1×) of the captured image. A button 420 (identified as "VC" for vehicle commander) identifies the operator who currently controls the camera. A circle 430 (located in the window's center) enables the operator to capture a still image of the current video frame on display. Directional arrows 450 along the border of the window 410 enable the operator to reposition the camera on its platform in any one of eight directions.

Figure 5:
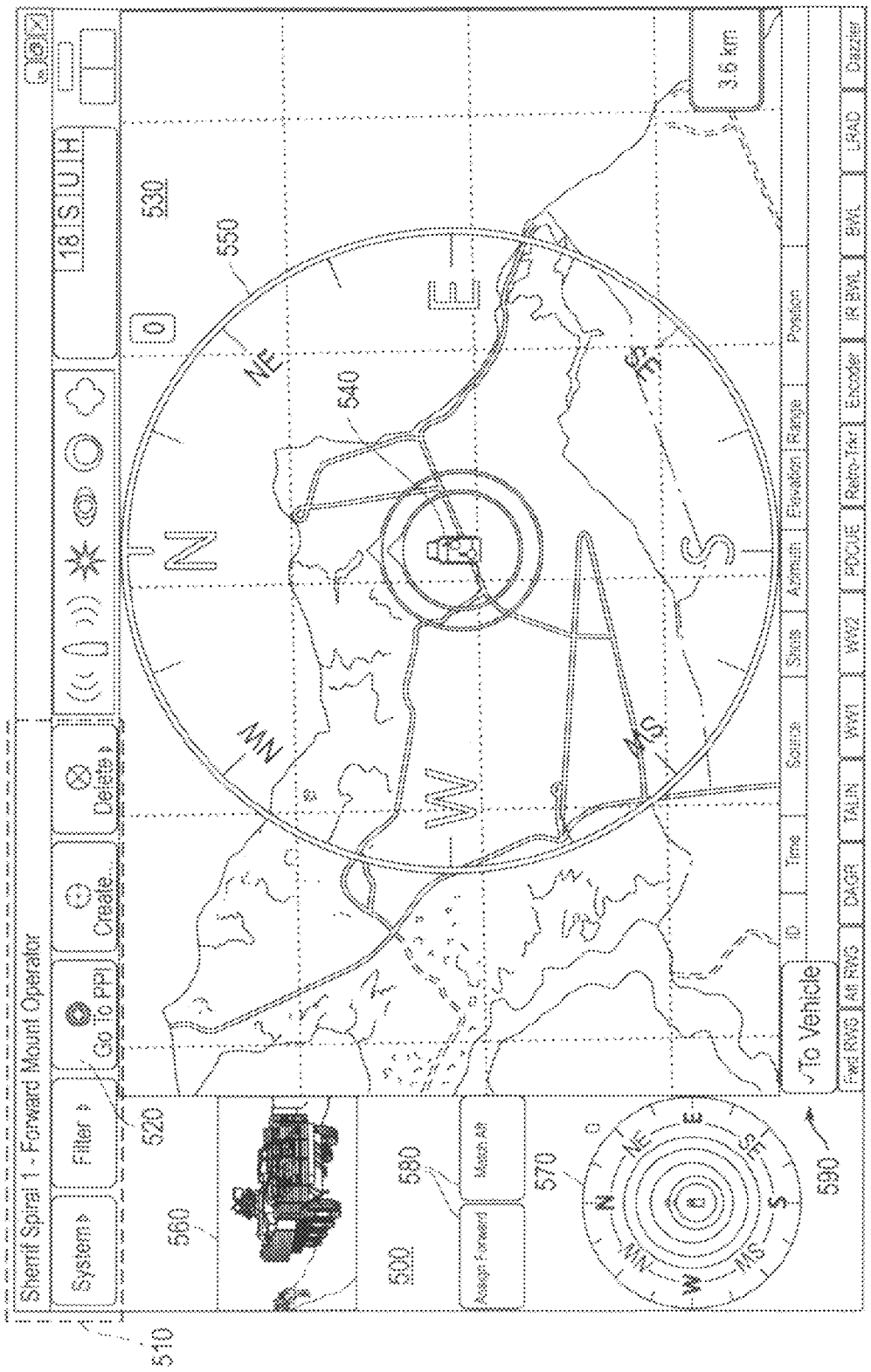
FIG. 5 is a graphical map view of geographical position.

FIG. 5 shows a first exemplary window 500 for the GUI used in Sheriff 360. The upper menu 510 includes buttons for system, filter, a sequential toggle 520 for polar direction and range view, create record and delete record. A view window 530 includes a map (featuring a naval reservation) centered about the vehicle's position 540 superimposed by a compass rose 550. Auxiliary adjacent thumbnail images of an exterior camera view 560 and a direction-range polar plot 570 are displayed to the left of the view window 530. Auxiliary command side menu buttons 580 and bottom menu buttons 590 provide additional commands for operations.

Figure 6:
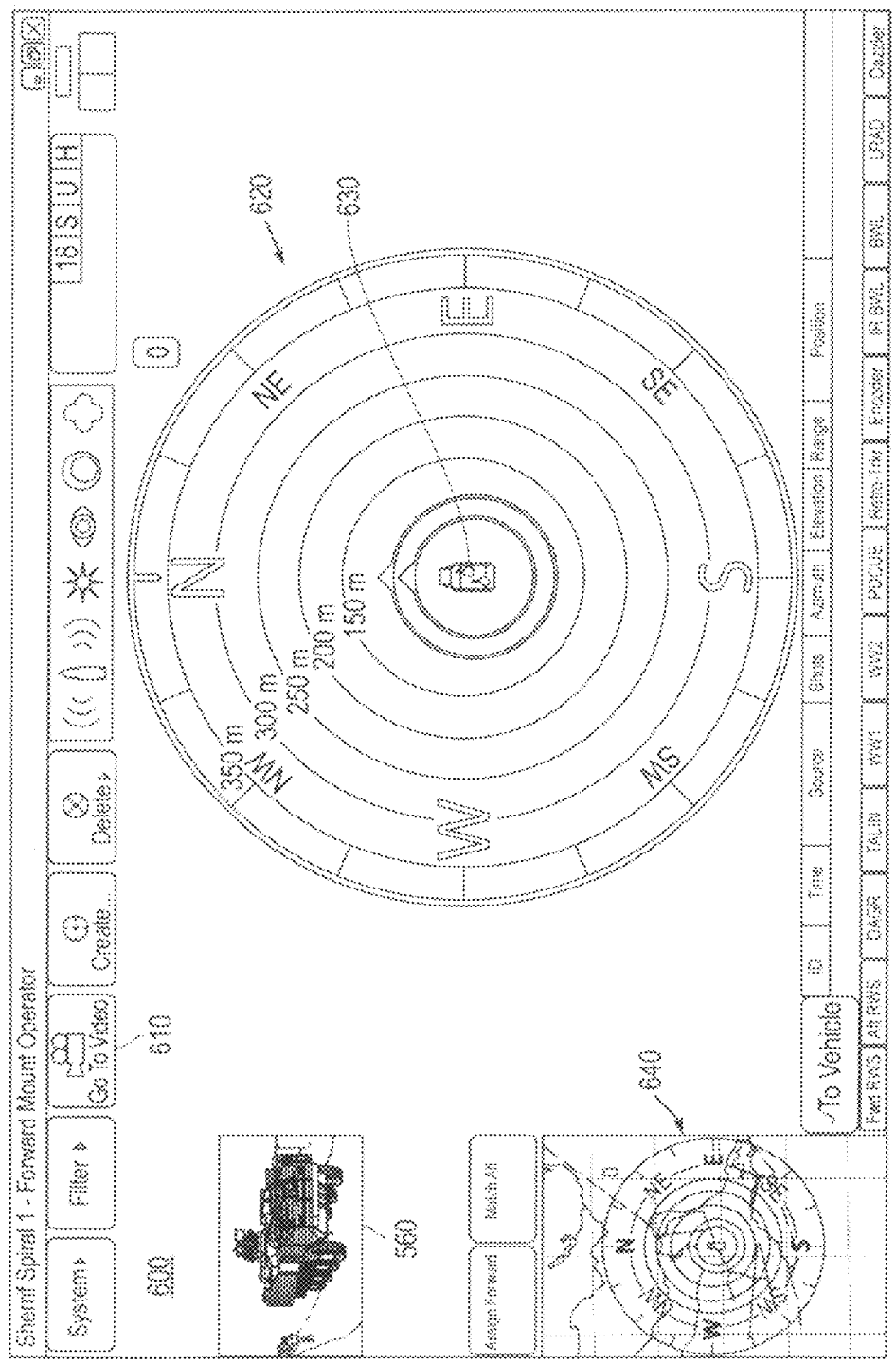
FIG. 6 is a polar directional and range view of surveillance.

FIG. 6 shows a second exemplary window 600 for the GUI in response to the operator selecting the toggle 520. In response, the toggle alters to video view icon on the button, now labeled 610. The view window, now labeled 620, displays a polar coordinate compass rose with geographical orientation and ranges (in meters) from the center icon 630. The adjacent thumbnail images include the exterior camera view 560 and a map view 640, as shown on the view window 530.

Figure 7:
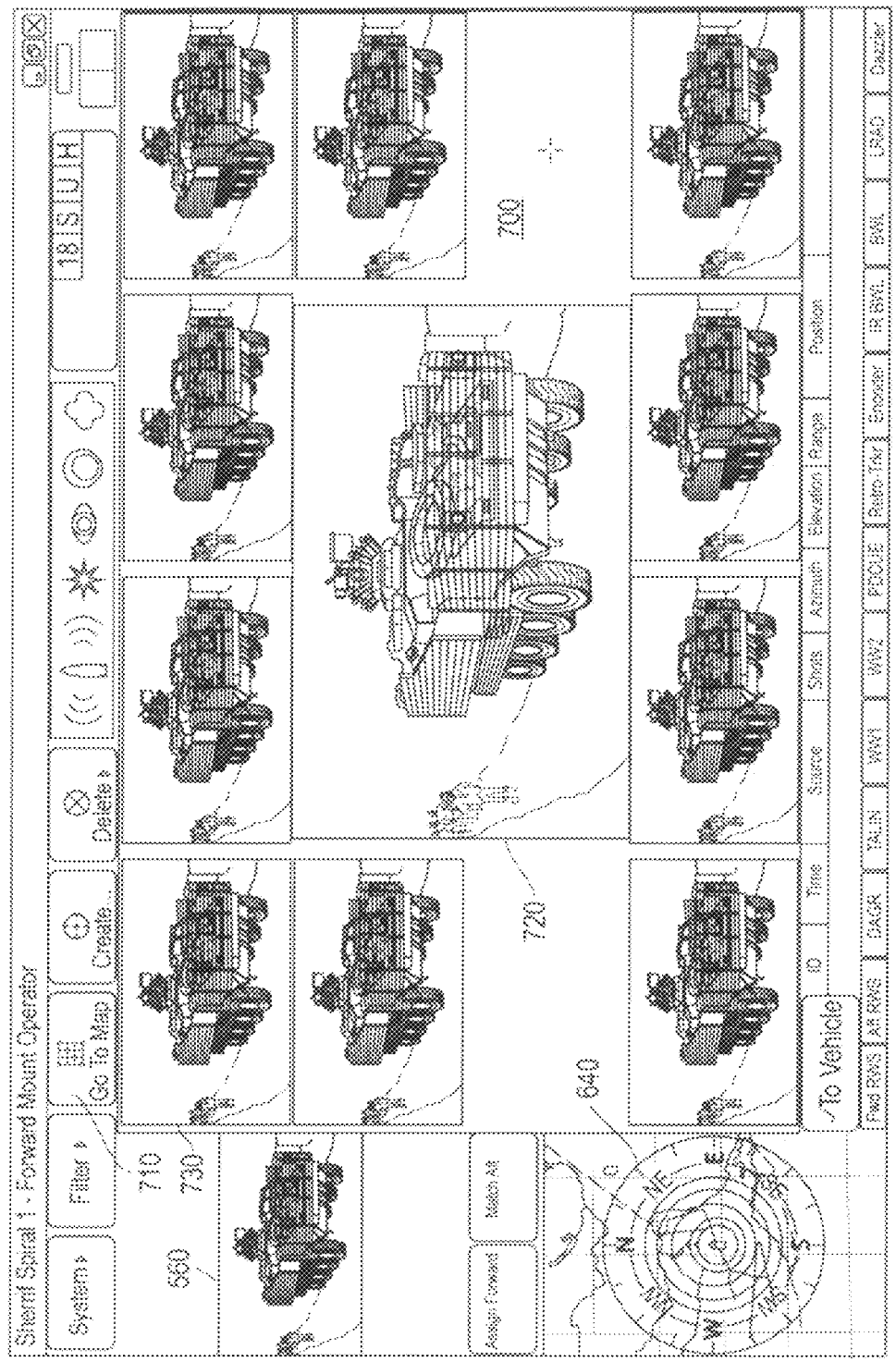
FIG. 7 is a photograph view of an adjacent position.

FIG. 7 shows a third exemplary window 700 for the GUI in response to the operator selecting the toggle 610. In response, the toggle switches to map view icon on the button, now labeled 710. An image view 720 includes an enlarged render of the camera imagery. Several smaller images surround this window 720, in this example showing the same image, but available for showing images 730 from alternate cameras from several vantages. The adjacent thumbnail images to the right of the window 720 include the exterior camera view 560 and the map view 630. The image view 720 represents the full resolution display of any of the adjacent thumbnail images 730.

Figure 8:
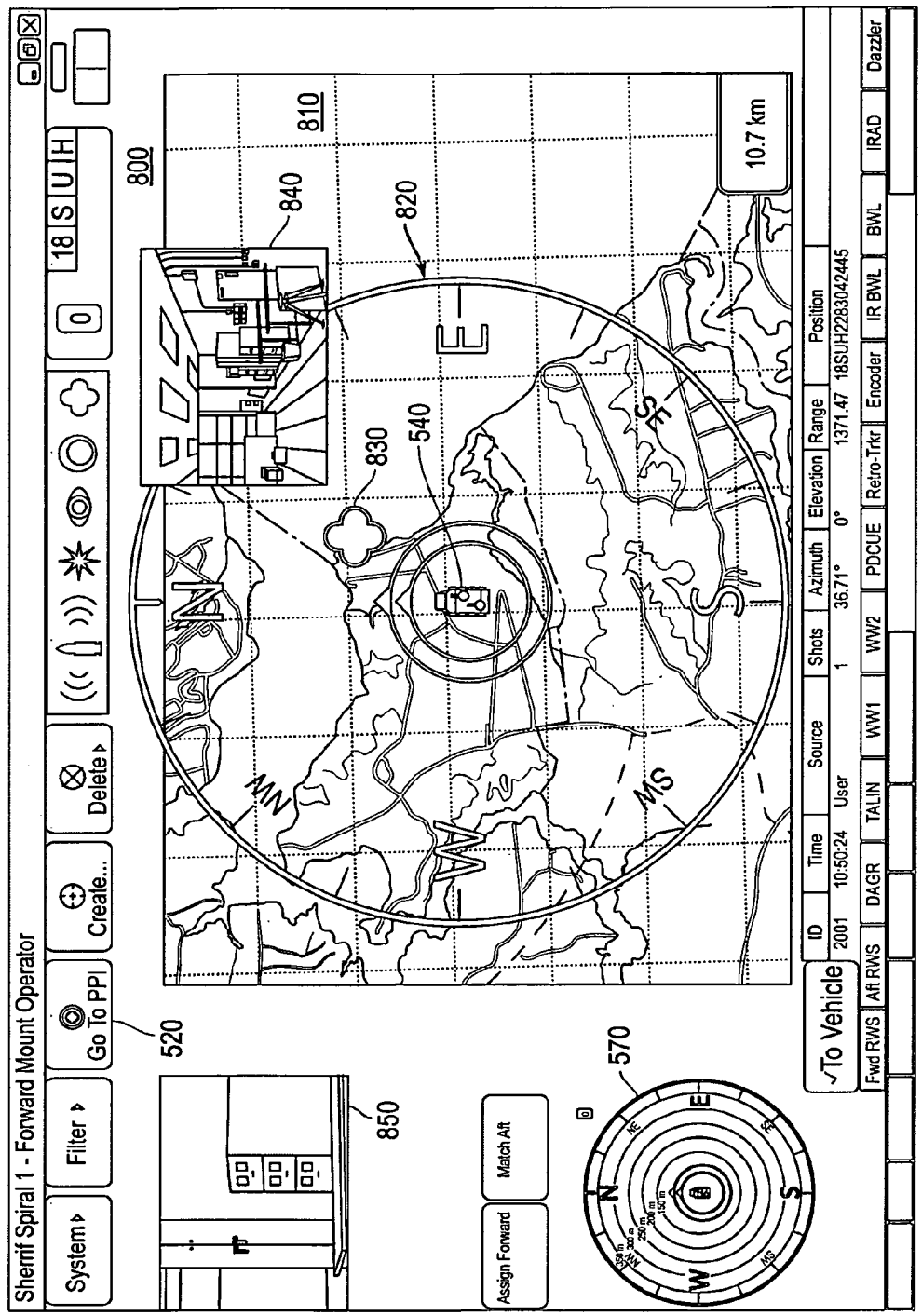
FIG. 8 is a graphical map view with triggering icon.

FIG. 8 shows a fourth exemplary window 800 for the GUI used in Sheriff 360 similar to the first exemplary window 500 with the sequential toggle 520 returned to polar direction and range view. The view window 810 includes a map modestly zoomed out from the map window 530 and the compass rose 820 about the center corresponding to the vehicle's map position 540. A rounded cruciform icon 830 identifies a location relative to the vehicle's position 540 where sensors detect occurrence of a triggering event. The icon 830 corresponds to an entity of unknown intent. Alternate icons can be employed for friendly, neutral and confirmed hostile positions. The upper right window 840 displays a video feed from a record retrieved from an event-registering buffer corresponding to the video from the surveillance camera that pointed in the direction of the triggering event. (The window 840 shows an interior laboratory image for demonstration purposes.) The upper left window 850 displays video stream from the gunsight optics, which can slew towards the event direction.

If the operator selects the icon 830, the permanently recorded images are then displayed to the operator in a video loop shown in the window 840. This loop contains image sequences before, during, and after the event. Thus, if an antagonist were to emerge from a place of hiding (e.g., the corner of a building), fire a shot, and then retreat to resume hiding, the recorded image sequence shows the building enabling the operator to view the antagonist emerge from behind the building, shoot, and go back behind the building. Thus, the system provides automatic recording of this sequence for the operator to view the pre- and post-event images and thereby assess the nature of the event for further attention.

While on patrol, a vehicle equipped with multiple surveillance cameras 210 can scan a wide area while personnel remain within the confines of that vehicle to provide protection. This enables continuous spatial coverage for a limited temporal interval before the buffer memory recycles storage. Shortly subsequent to an event registered by a sensor that triggers a response, the archival memory automatically retrieves buffer contents from a surveillance camera that points to the sensor-indicated direction of the event, while video recording continues into the buffer.

The memory contains images over a first interval prior to the event, as well as over a second interval after the event, in order to more complete context to circumstances surrounding the event. The operator is alerted and may select the archived video recording from the archival memory. The operator can be alerted by a sensor, which may be installed in each camera, such as an optical flash photometer or an audio shock transducer. This selection can be made by the operator or performed automatically in response to a specified sensor stimulus. Meanwhile the cameras 210 continue to record visual images at a specified frame rate.

The archive thereby contains continually sequential visual records before, during and after the triggering event, which can be immediately reviewed to assess the event's hazardous nature against which a response (lethal or non-lethal, if any) may then be decided. Such operation enables visual information to be obtained more rapidly and completely with which to issue critical instructions in the field. Because the workstations 120 have interoperable redundancy, the failover of any single platform does not jeopardize receipt and process of the visual information for evaluation. Artisans of ordinary skill will recognize that such methods and systems are applicable for stationary buildings, in addition to road-mobile vehicles.

VideoSlinger provides a subsystem for Sheriff that streams video from various cameras around the vehicle to the operator of the Sheriff video surveillance system. VideoSlinger enables the operator to interact with the camera systems to view targets, reposition, and zoom the cameras. The VideoSlinger subsystem includes the following capabilities in relation to various exemplary embodiments: (a) retrieve video from various cameras and display the video to the operator and store video for deferred viewing; (b) snap still images of targets upon detection; (c) enable the operator to select camera video streams for discretionary viewing; (d) enable the operator to capture selected still images of the video streams; (e) enable the operator to pan/tilt/zoom selected cameras under camera control; (f) maintain reliability of direct control of the VideoSlinger cameras, such as by brain failover hardware features; (g) manually control the cameras in a first-come, first-serve priority basis; (h) automated control assumed of a specified camera to capture an image of a new target in response to a specified event, thereby suspending manual control by the operator until the system completes its required assignments; (i) inhibition of manual control transfer to another operator until current operator has released control authority.

In various exemplary embodiments, the operator maintains control of the cameras in the following manners: (a) monitor display for the camera shows directional buttons for directions N, NE, E, SE, S, SW, W, NW, and displays a center capture image for manual screen capture; (b) the directional display is configurable enabling the operator to select how and whether the buttons appear, such as always, never or hover (i.e., when the operator moves the cursor into a defined region), (c) zoom in, zoom out, current zoom ratio and reset buttons are above the video feed; (d) zoom ratio is displayed (e.g., "1×", "2×", etc.) at a screen position (e.g., upper right corner above the video feed), with digital zoom indicated by a supplemental "D", and reset returning the camera to the default ratio; (e) identity of the operator in control is displayed at a screen position (e.g., in the upper left corner), such as "VC" for vehicle commander, "LE" for lethal operator and "NL" for non-lethal operator, or other designators as desired; (f) directional indicators for the camera can be indicated by a compass rose and/or other mount indicators.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for providing to an operator in a vehicle a video stream from at least one of a plurality of cameras mounted to said vehicle comprising:

connecting to a vehicle network the plurality of cameras that can each continually capture a temporal sequence of images;

integrating a computer in the vehicle to said network;

recording said sequence of images from each camera of the plurality of cameras into a corresponding buffer accessible to said computer;

detecting a triggering event associated with an event recording camera of the plurality of cameras assigned to an event recording buffer;

depositing said sequence of images from said event-recording buffer corresponding to said event-recording camera as the video stream into a reviewable memory in response to said triggering event; and retrieving the video stream from said reviewable memory for the operator wherein the operator is one of a plurality of operators using a plurality of workstations including: a first workstation and at least a second workstation, and each said workstation is assigned as one of a primary brain and failover brains, said primary brain functions to execute software and issue control signals, such that in response to failure of said primary brain, one of said failover brains assumes said functions, said one being selected in a sequential order, wherein said plurality of workstations includes:

a command workstation, a lethal response workstation, and a non-lethal response workstation.

2. The method according to claim 1, wherein responding to a triggering event further includes alerting the operator.

3. The method according to claim 2, wherein the operator selects said event-triggering camera.

4. The method according to claim 1, wherein responding to said triggering event further includes continuing to capture said sequence of images by said event-triggering camera.

5. The method according to claim 1, wherein responding to said triggering event further includes continuing to capture said sequence of images by said each camera of the plurality of cameras.

6. The method according to claim 1, wherein the operator is one of a commander using the command workstation, a lethal response operator using the lethal workstation, and a non-lethal response operator using the non-lethal workstation.

7. The method according to claim 1, wherein said failover brains are synchronized to said primary brain.

8. The method according to claim 6, wherein at least one of said workstations displays at least one of a map, a compass rose, and said images from a select camera of said plurality of cameras.

9. The method according to claim 8, wherein said at least one of said workstations provides controls to adjust at least one of direction and zoom of said images.

10. A system installed in a vehicle for providing to an operator of a plurality of operators a video stream from at least one of a plurality of cameras, comprising:

a network connecting to the plurality of cameras that can each continually capture a temporal sequence of images;

a computer connecting to said network, said computer executing video recording interface software;

a plurality of workstations for the corresponding plurality of operators, said plurality communicating with said computer and Including a first workstation and at least a second workstation, each said workstation being assigned as one of a primary brain and failover brains, said primary brain functioning to execute software and issue control signals, such that in response to failure of said primary brain, one of said failover brains assumes said functions, said one being selected in a sequential order;

a buffer for each camera of the plurality of cameras, said buffer storing said sequence of images being accessible to said computer;

a sensor to detect a triggering event associated with an event-recording camera of the plurality of cameras;

a reviewable memory for retrieving, in response to said triggering event, said sequence of images from said buffer that corresponds to said event-recording camera to produce the video stream; and a display connecting to said reviewable memory for displaying the video stream to the operator, wherein said plurality of workstations includes:

a command workstation, a lethal response workstation, and a non-lethal response workstation.

11. The system according to claim 10, wherein a workstation of said plurality of workstations is associated with said display for use by the operator.

12. The system according to claim 11, wherein said failover brains are synchronized to said primary brain.

13. The system according to claim 11, wherein at least one of said workstations displays at least one of a map, a compass rose, and said sequence of images from a select camera of said plurality of cameras.

14. The system according to claim 13, wherein said at least one of said workstations provides controls to adjust at least one of direction and zoom of said sequence of images.

* * * * *